United States Patent [19]
Eichhorn et al.

[11] Patent Number: 5,275,464
[45] Date of Patent: Jan. 4, 1994

[54] VEHICLE BOOSTER SEAT

[75] Inventors: Anthony E. Eichhorn, East Amherst, N.Y.; Frederick L. Schreier, Rochester Hills, Mich.; Mark A. Wojtkiewicz, Lancaster, N.Y.

[73] Assignee: Fisher-Price, Inc., East Aurora, N.Y.

[21] Appl. No.: 50,984

[22] Filed: Apr. 22, 1993

Related U.S. Application Data

[63] Continuation of Ser. No. 767,832, Sep. 30, 1991, abandoned.

[51] Int. Cl.⁵ .............................................. B60N 2/28
[52] U.S. Cl. ................................... 297/250; 297/467; 297/488
[58] Field of Search ............... 297/250, 466, 467, 487, 297/488

[56] References Cited

U.S. PATENT DOCUMENTS

| | | | |
|---|---|---|---|
| D. 212,215 | 9/1968 | Brilmyer et al. | |
| D. 272,692 | 2/1984 | Hallgren | |
| D. 276,098 | 10/1984 | Cone | |
| D. 276,099 | 10/1984 | Cone | |
| D. 289,830 | 5/1987 | Kain | |
| D. 291,032 | 7/1987 | Sauter et al. | |
| D. 300,992 | 5/1989 | Cleavenger | |
| D. 307,834 | 5/1990 | Sudoh et al. | |
| D. 311,822 | 11/1990 | Meeker | |
| D. 315,253 | 3/1991 | Kain | |
| 3,103,385 | 9/1963 | Grieco | |
| 3,424,497 | 1/1969 | Brilmyer et al. | |
| 3,563,600 | 2/1971 | Converse | 297/466 |
| 3,865,433 | 2/1975 | Stafford | |
| 3,948,556 | 4/1976 | Hyde et al. | |
| 3,964,787 | 6/1976 | Labadie et al. | |
| 4,155,591 | 5/1979 | Mauron | |
| 4,463,984 | 8/1984 | Molnar | |
| 4,521,052 | 6/1985 | Cone | |
| 4,568,122 | 2/1986 | Kain | 297/250 X |
| 4,591,208 | 5/1986 | McDonald et al. | |
| 4,643,474 | 2/1987 | Wise et al. | 297/488 X |
| 4,662,683 | 5/1987 | Knoedler et al. | |
| 4,671,574 | 6/1987 | Kassai | 297/488 X |
| 4,687,255 | 8/1987 | Klanner et al. | 297/488 X |
| 4,754,999 | 7/1988 | Kain | |
| 4,765,685 | 8/1988 | Sudoh et al. | 297/250 X |
| 4,798,412 | 1/1989 | Kohus et al. | |
| 4,943,112 | 7/1990 | Law | 297/238 |
| 4,984,845 | 1/1991 | Knoedler et al. | 297/250 |

FOREIGN PATENT DOCUMENTS

| | | | |
|---|---|---|---|
| 3313870 | 10/1984 | Fed. Rep. of Germany | 297/488 |
| 3536206 | 4/1987 | Fed. Rep. of Germany | 297/250 |

OTHER PUBLICATIONS

Instruction Manual, Century® CR-3 Car Seat, Century Products Co., date unknown.

Advertisement Brochure, Gerry™ Car Seats, date unknown.

Primary Examiner—Peter R. Brown
Attorney, Agent, or Firm—Howrey & Simon

[57] ABSTRACT

A vehicle booster seat includes a base adapted to be supported on a vehicle seat for supporting a child on the base in an elevated position relative to the vehicle seat; first and second side bolsters on the base extending upwardly from the base for laterally restraining the child; first and second slots in the first and second side bolsters for receiving the vehicle seat belt and guiding the seat belt over the child to restrain the child in the booster seat, and secure the booster seat to the vehicle seat; a removable shield for restraining a child in the booster seat with a lap belt only, the shield including a generally U-shaped shield body having first and second tongue members extending therefrom adapted to slidingly engage the first and second slots in the base respectively for receiving the U-shaped shield in the base; and a guide in the shield body for receiving a seat belt for securing the U-shaped shield to the base and securing the base relative to the vehicle seat.

8 Claims, 4 Drawing Sheets

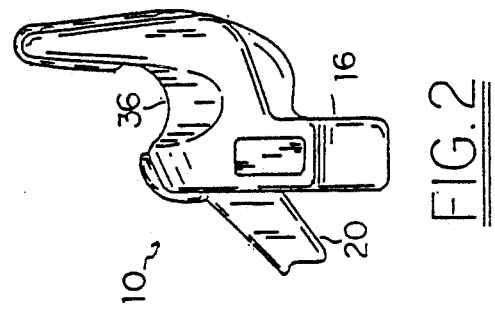
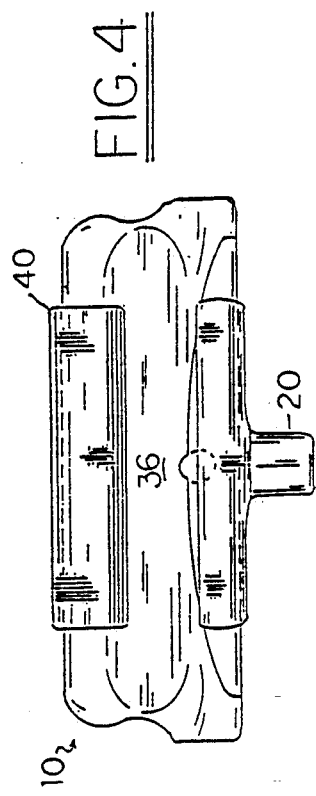
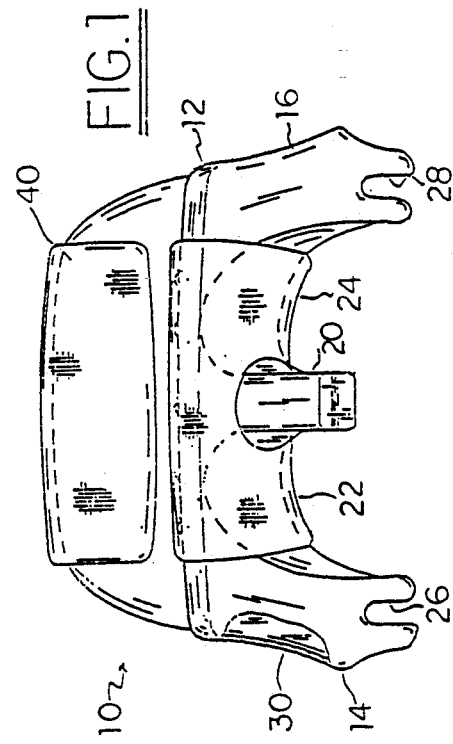
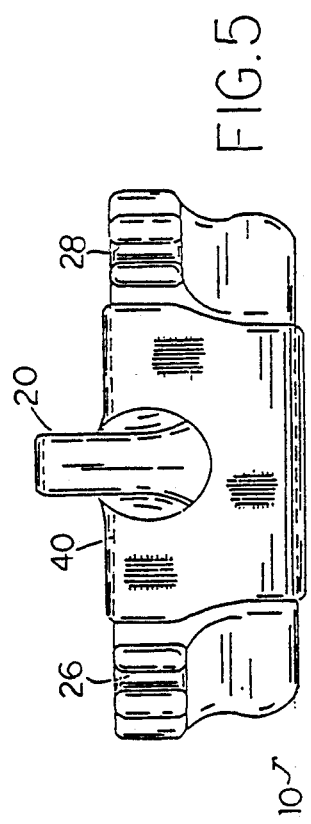
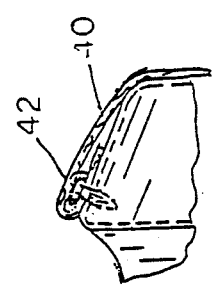
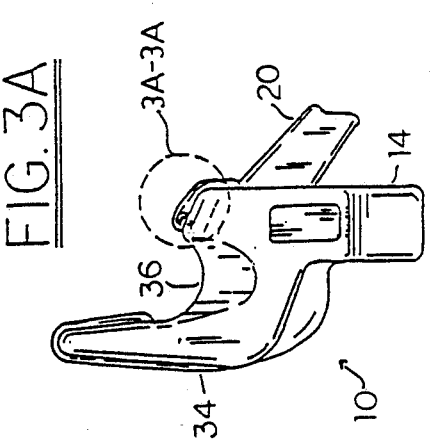

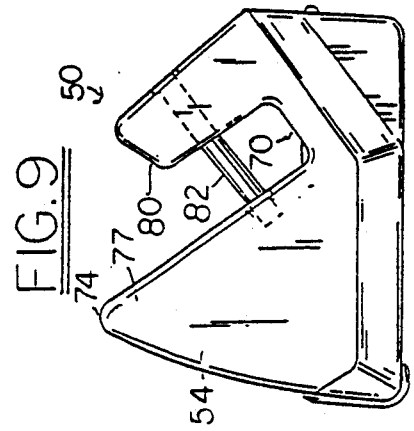
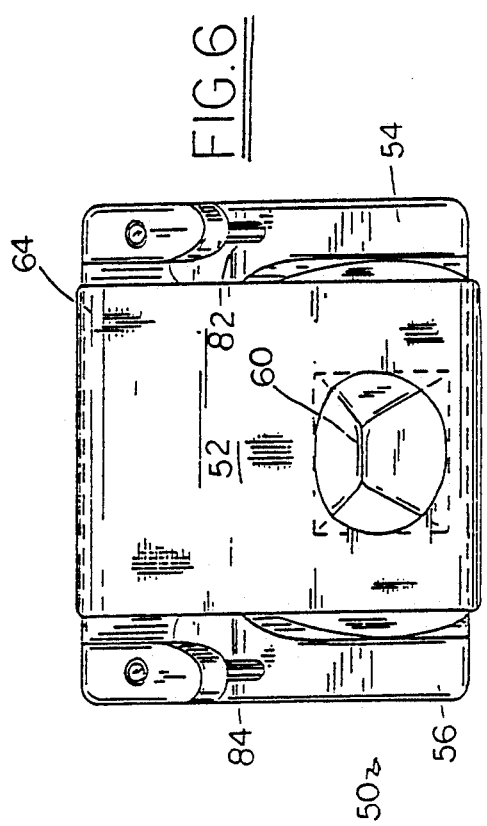
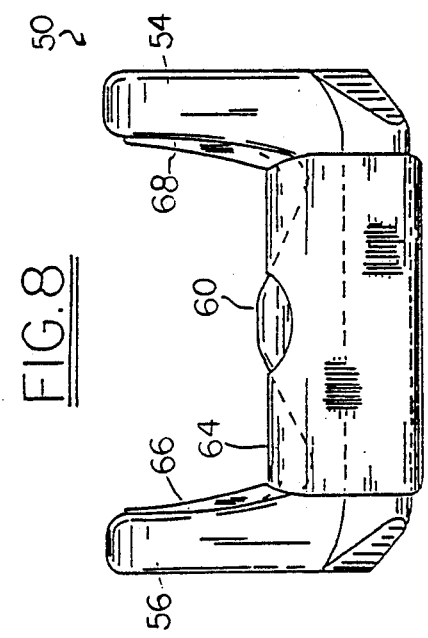
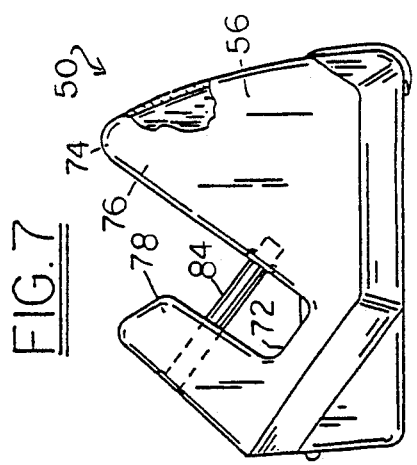

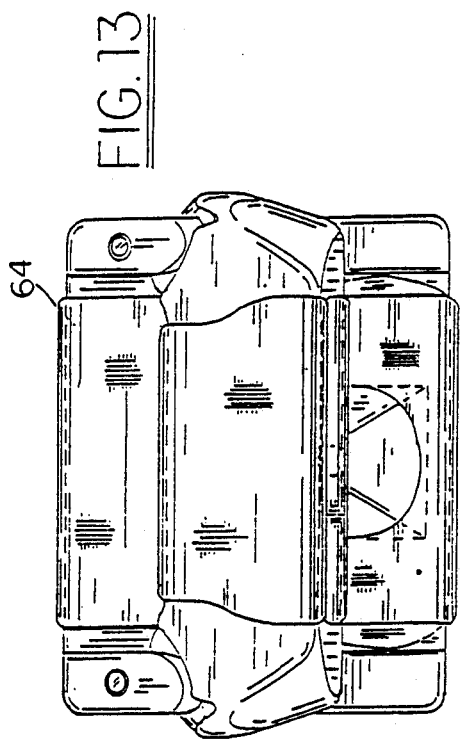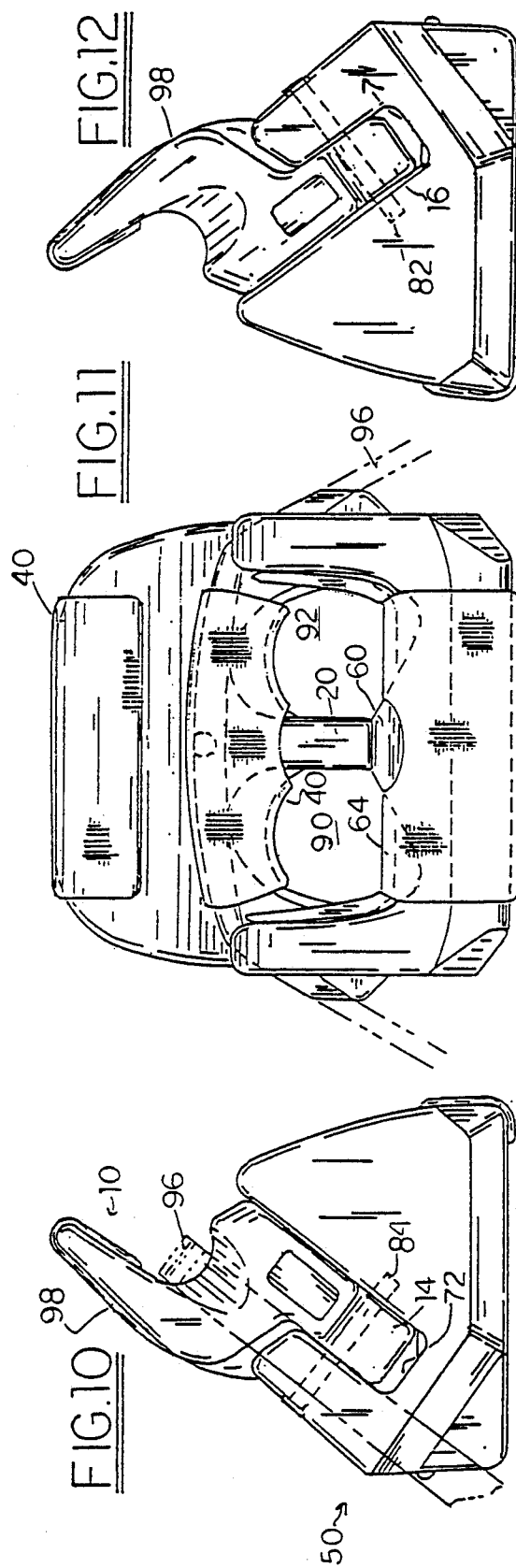

VEHICLE BOOSTER SEAT

This application is a continuation of application Ser. No. 07/767,832, filed on Sep. 30, 1991, now abandoned.

This invention relates generally to booster seats for use by children in motor vehicles, and more particularly to a vehicle booster seat that is convertible for use with a lap belt in combination with an auxiliary shield, or a lap and shoulder belt for use without an auxiliary shield.

As children grow, they eventually become too large for conventional car seats, but not large enough to sit directly on vehicle seats and be restrained solely by seat belts because of improper fit. Further, even if a child is large enough to use a vehicle seat directly, she may be too short to see out the window, and be unhappy while travelling, and contribute to the unhappiness of her travelling companions. There is a need for a vehicle booster seat for use by children, that is versatile in its application, so as to accommodate either children of various sizes, or the same child as she grows.

It is also desirable to provide a vehicle booster seat that can be used either with an automobile lap belt alone, or with the combination of a lap belt and shoulder belt.

It is also desirable to provide a vehicle booster seat having a removable shield for use by children when only lap belts are available.

Briefly stated, and in accordance with a presently preferred embodiment of this invention, a vehicle booster seat includes a base adapted to be supported on a vehicle seat for supporting a child on the base in an elevated position relative to the vehicle seat;

first and second side bolsters on the base extending upwardly from the base for laterally restraining the child;

first and second slots in the first and second side bolsters for receiving the vehicle seat belt and guiding the seat belt over the child to restrain the child in the booster seat, and secure the booster seat to the vehicle seat;

a removable shield for restraining a child in the booster seat with a lap belt only, the shield including a generally U-shaped shield body having first and second tongue members extending therefrom adapted to slidingly engage the first and second slots in the base respectively for receiving the U-shaped shield in the base; and a guide in the shield body for receiving a seat belt for securing the U-shaped shield to the base and securing the base relative to the vehicle seat.

The novel aspects of the invention are set forth with particularity in the appended claims. The invention itself, together with further objects and advantages thereof may be more fully comprehended by reference to the following detailed description of a presently preferred embodiment of the invention, taken in conjunction with the accompanying drawings, in which:

FIG. 1 is a front elevation of the U-shaped shield portion of this invention;

FIG. 2 is a right side view thereof;

FIG. 3 is a left side view thereof;

FIG. 3a is an enlarged detail of FIG. 3;

FIG. 4 is a top plan view of the U-shaped shield;

FIG. 5 is a bottom plan view thereof;

FIG. 6 is a top plan view of the base of a vehicle booster seat in accordance with this invention;

FIG. 7 is a left side elevation thereof;

FIG. 8 is a front elevation thereof;

FIG. 9 is a right side elevation;

FIG. 10 is a left side elevation view of a vehicle booster seat in accordance with this invention, showing the base and U-shaped shield in operatively assembled relationship;

FIG. 11 is a front elevation thereof;

FIG. 12 is a right side elevation thereof;

FIG. 13 is a top plan view thereof;

Figure 15:
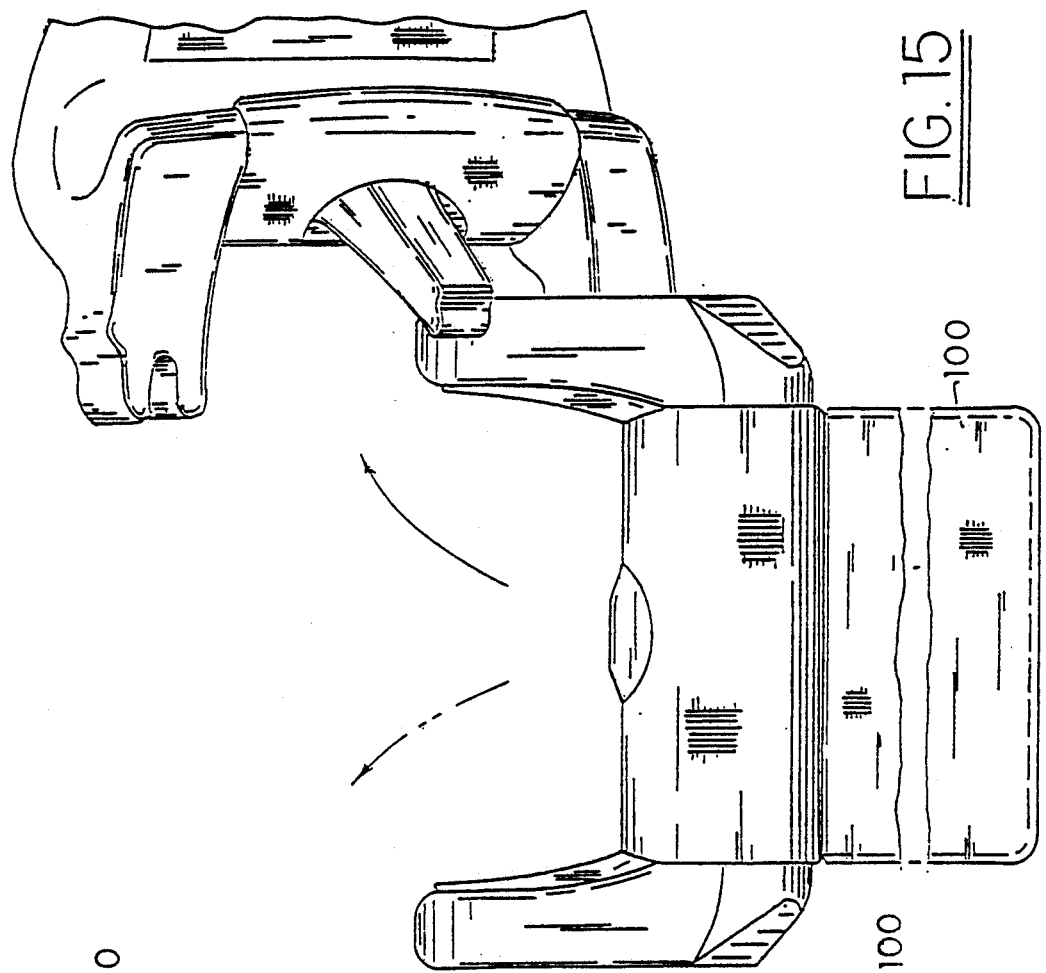
FIG. 15 is a front elevational view thereof.

Referring now to FIGS. 1-5, the shield portion 10 of a vehicle booster seat in accordance with this invention is illustrated in a series of views in orthographic projection. In these and in the remaining figures, like elements are designated by like reference numerals. The shield designated generally by the reference numeral 10 has a shield body 12 that is generally U-shaped in front elevation, as shown in FIG. 1, and which includes a first tongue member 14 and a second tongue member 16 forming the sides of the U. A retaining member 20 extends from the base of the U-shaped body 12 in the same direction as the tongue members 14, 16 to form first and second arch shaped leg receiving openings 22, 24. Preferably, the tongue members are provided with slots 26, 28 in the end portions thereof for engaging pins in the base of the booster seat, as will be described below. Preferably, the shield 10 is molded, more preferably rotomolded, from a suitable plastic material to form a shield having a relatively thin wall 30, which is light in weight, but strong. As shown in the side views of FIGS. 2 and 3, the upper portion 34 of the shield body 12 has a long broad U-shaped recess 36 formed therein for receiving a vehicle seatbelt for holding the shield and base of the booster seat together, and securing the combination to the vehicle seat, as will be described in more detail below.

Preferably, a decorative and/or protective padded fabric cover 40 is secured to the shield at each end of the fabric layer by removable fasteners, as can be most clearly seen in FIGS. 3 and 3a, so that the fabric layer may be removed.

The base 50 of the booster seat 10 is shown in FIGS. 6-9. Like the shield 10, the base 50 is preferably formed from a rotomolded plastic body. The base is generally rectangular as seen in plan view in FIG. 6, and includes an at least generally flat seating portion 52, with first and second side bolsters 54, 56 extending upwardly from the seating portion 52. Preferably, the seating portion 52 is sized to comfortably receive and restrain a child, and includes a slightly upwardly projecting pyramidal member 60 for cooperatively engaging the end of the retaining member 20 of the shield 12, as will be even more clearly shown and described below. The seating portion of the base is preferably covered with a padded fabric layer 64 that is attached to the undersurface of the base 50 at the ends of the fabric layer by any suitable removable fasteners. The padded fabric layer 64 has flaps 66, 68 extending laterally along the inside surfaces of the first and second side bolsters 54, 56 that extend upwardly from the base along the sides thereof, for laterally restraining the child occupant.

As most clearly seen in FIGS. 7 and 9, the side bolsters 54, 56 are very generally triangular as seen in elevational view, and include first and second slots 70, 72 extending completely through the side bolsters 54, 56, and inclined downwardly and rearwardly from the top 74 of the front of the side bolsters towards the rear third of the seating surface. The walls of the slot are formed by a forward portion 76, 77 of each side bolster, and a rearward portion 78, 80 thereof, the forward portions being both higher and wider than the rearward portions. First and second pivot pins or protrusions 82, extend into the slot, leaving a pivot portion exposed within each slot, disposed at an angle to the seating surface 64 and raised slightly above the seating surface. Preferably, the pins or protrusions are metal or rigid plastic, or the like.

The base 50 and shield member 10 of the booster seat in accordance with this invention are shown in their assembled configuration in FIGS. 10-13. As can be seen clearly in FIGS. 10 and 11, the tongues 14, 16 of the shield member 10 are slidably received in the slots 72, 74 of the base member 50. The pivot pins or protrusions 82, 84 in the base member 50 are received within the grooves 26, 28 in the ends of the tongue members 14, 16 of the shield 10, and the shield is supported with respect to the base by the pins or protrusions. As can be seen most clearly in FIG. 11, the central retaining member 20 of the shield engages the upstanding pyramidal projection 60 of the base to form two leg receiving openings 90, 92 in the assembled booster seat. The fabric padding layers 40, 64 on the base 50 and shield 10, cushion the child's legs to increase comfort.

In using the seat, a child sits on the seating surface 52 of the base 50, facing to the right, as shown in FIG. 10, with his back to the left. His legs extend through the openings 90, 92 and hang down in a natural fashion. A vehicle seat belt 96 (shown in phantom) is positioned within the broad shallow recess 36 of the shield 10, as shown in phantom in FIGS. 10 and 11. When the shield member 10 is in place, only a lap belt is used to secure the booster seat and its occupant to the vehicle seat. The seat belt holds the shield 10 in place with respect to the base 50, and holds the assembly to the vehicle seat. As can be seen clearly in FIGS. 10 and 12, the shield includes an upwardly and forwardly extending broad chest supporting portion 98 that is covered by the fabric padding layer 40, for supporting the child in a forward leaning position, as might occur during a stop, or when the child intentionally leans forward.

Figure 14:
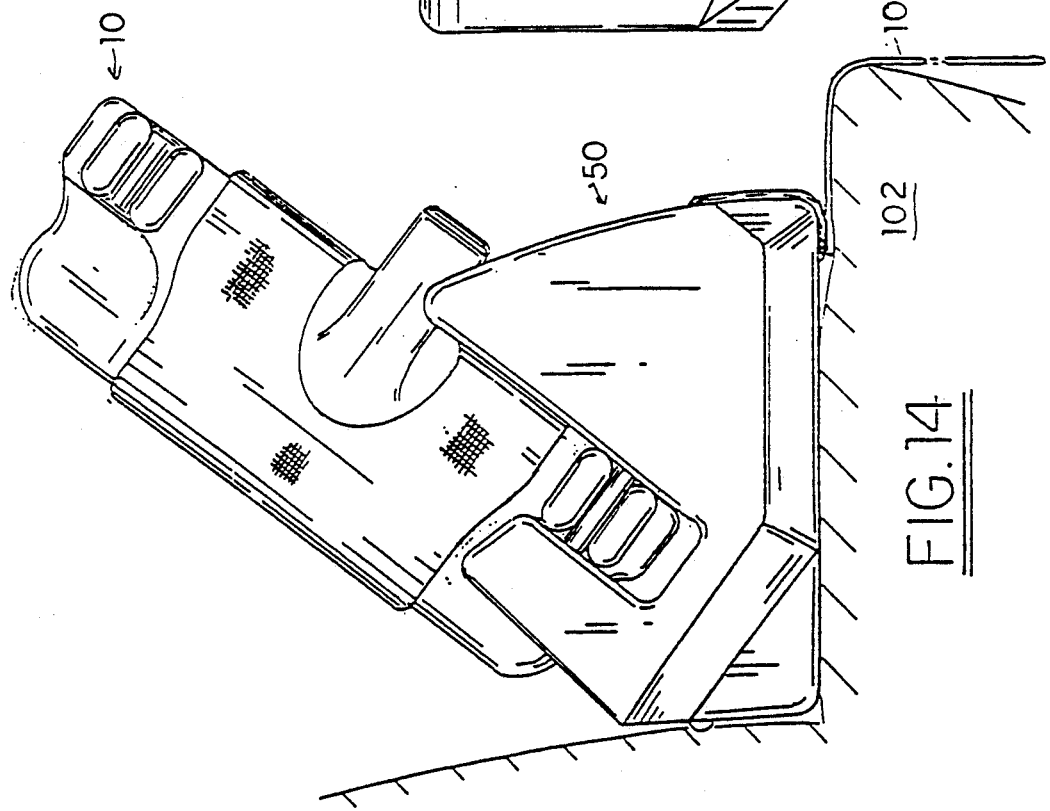
FIG. 14 is a right side elevation of a vehicle booster seat in accordance with this invention showing the U-shaped shield portion pivoted to an access position for allowing a child to be placed in the booster seat.

As shown in FIGS. 14 and 15, the shield 10 may be pivoted with respect to the base 50, in addition to being slid out for opening the booster seat to allow a child to seat himself or be placed therein. The shield 10 may be pivoted with respect to either of the side bolsters 54, 56 of the base as shown in FIG. 15, for creating a left or right entry configuration, as desired or dictated by the position of the booster seat within the vehicle.

As shown in FIGS. 14 and 15, an auxiliary protective fabric sheet 100 is secured to the lower forward edge of the base 50 of the booster seat for extending over the forward portion and edge of the vehicle seat 102, for protecting the vehicle seat from damage by the child's feet.

While the invention has been described in connection with a presently preferred embodiment thereof, those skilled in the art will recognize that many modifications and changes may be made therein, without departing from the true spirit and scope of the invention, which accordingly is intended to be defined solely by the appended claims.

What is claimed is:

1. A vehicle booster seat comprising:
   a base adapted to be supported on a vehicle seat for supporting a child on the base in an elevated position relative to the vehicle seat;
   first and second side bolsters extending upwardly from the base for laterally restraining the child;
   first and second slots in the first and second side bolsters for receiving a vehicle seat belt and guiding the seat belt over the child to restrain the child in the bolster seat and secure the booster seat relative to the vehicle seat; and
   removable shield means for restraining a small child in the booster seat, the shield means comprising:
   a generally U-shaped shield body having first and second tongue members adapted to slidingly engage the first and second slots respectively for receiving the U-shaped shield in the base; and
   guide means in the shield body for receiving a seat belt for securing the U-shaped shield in the base, and securing the base relative to the vehicle seat;
   said first and second slots each shaped to have opposing sidewalls and a bottom wall;
   said first and second slots each having a pivot post spanning said opposing sidewalls;
   said first and second tongue members each having an indentation shaped to receive said pivot post such that said shield is selectively pivotable about said pivot post of either of said first and second slots;
   said opposing sidewalls of said first and second slots being spaced from each other and said pivot post being spaced from said bottom wall such that said tongue member is in touching contact with said bottom wall and at least one of said sidewalls after said shield has been pivoted about the pivot post of either of said first and second slots so as to retain said shield body in said base when said shield has been pivoted.

2. The vehicle booster seat of claim 1 in which the first and second side bolsters comprise generally triangular members extending upwardly from the base.

3. The vehicle booster seat of claim 2 in which the first and second slots in the first and second side bolsters comprise slots arranged at an angle with respect to a seating surface on the base.

4. The vehicle booster seat of claim 1 in which the removable shield means further comprises a retaining member disposed generally between the first and second tongue members, and extending outwardly from the shield body.

5. The vehicle booster seat of claim 4, in which the base comprises an upwardly extending pedestal for engaging the retaining member for forming first and second leg receiving openings between the shield body and the base.

6. The vehicle booster seat of claim 1, in which the guide means in the shield body comprises a wide shallow depression in an upper portion of the shield body for receiving and guiding a seat belt.

7. The vehicle booster seat of claim 1, comprising a protective sheet attached to a forward edge of the vehicle booster seat for extending over a vehicle seat, to protect the vehicle seat from the feet of a child occupant.

8. The booster seat of claim 1 in which the pivot post for each of said first and second slots is spaced from said bottom wall for supporting the vehicle seat belt above the base of the booster seat when the shield is not used.

* * * * *